Patented Oct. 9, 1923.

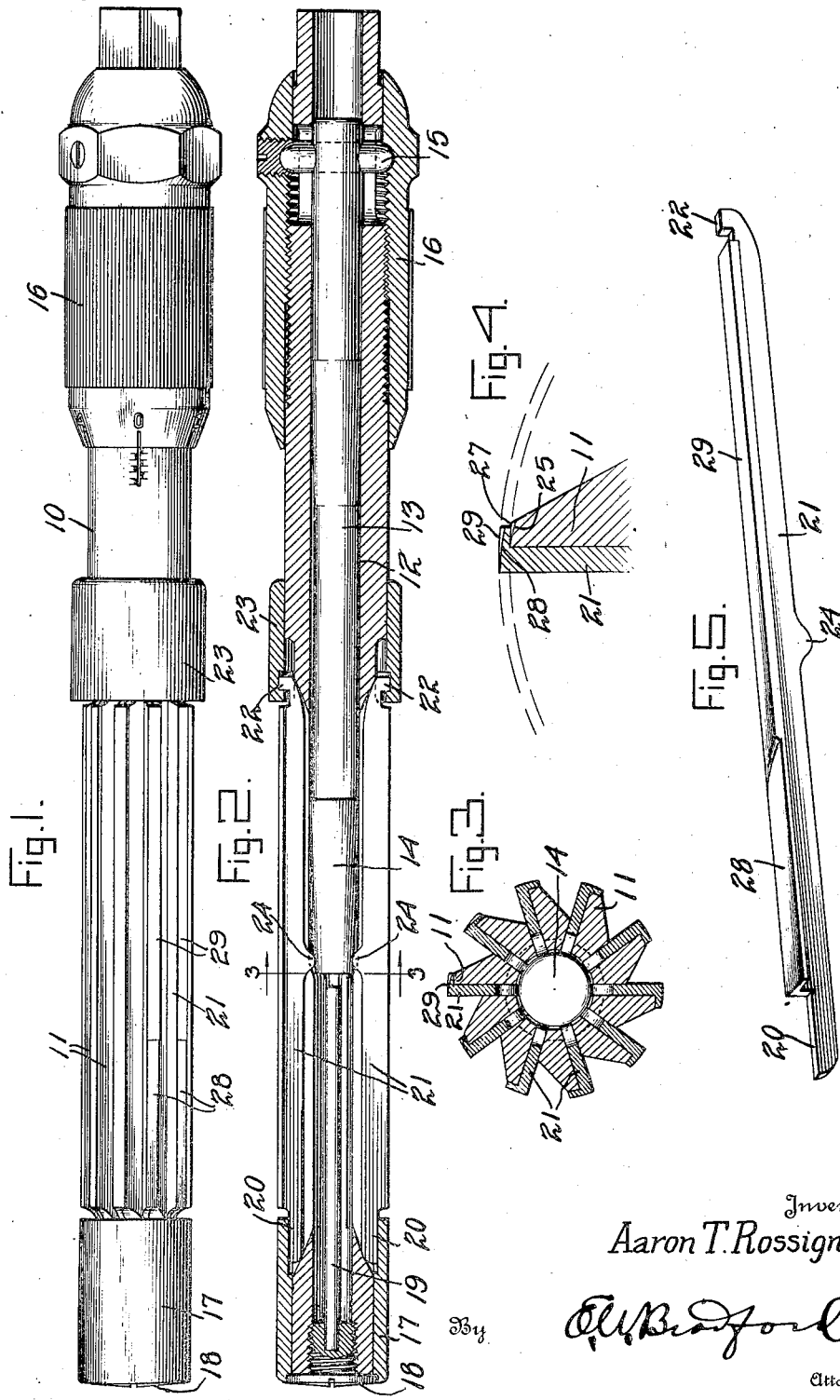

1,470,545

UNITED STATES PATENT OFFICE.

AARON T. ROSSIGNOL, OF WASHINGTON, DISTRICT OF COLUMBIA, ASSIGNOR, BY MESNE ASSIGNMENTS, TO J. PAGE LAUGHLIN HOLDINGS COMPANY, OF HUNTINGDON, PENNSYLVANIA, A CORPORATION OF PENNSYLVANIA.

REAMER.

Application filed October 22, 1921. Serial No. 509,553.

*To all whom it may concern:*

Be it known that I, AARON T. ROSSIGNOL, a citizen of the United States, residing at Washington, in the District of Columbia, have invented certain new and useful Improvements in Reamers, of which the following is a specification.

My said invention relates to an improved reamer and it is an object of the invention to provide a reamer which will impart a high finish to the work.

A further object of the invention is to provide a reamer with removable blades in sets of different sizes, by which holes of various sizes may be reamed out.

Still another object is to provide a reamer that will cut smoothly and evenly in spite of key slots, oil-grooves and other variations in the surface.

Referring to the accompanying drawings which are made a part hereof and on which similar reference characters indicate similar parts, Figure 1 shows my device in elevation, Figure 2 is a longitudinal section of the same, Figure 3, a transverse section on an enlarged scale, Figure 4, a detail still further enlarged, and Figure 5, an enlarged perspective of a single blade of the reamer.

In the drawings reference character 10 indicates the shank of a reamer having expansible, permanent blades 11 some or all of which may be separated by slots milled through to the hollow center at 12. An expander 13 having a conical forward end 14 is located in said hollow center and cooperates with inclined surfaces on the blades for expanding them. At the rear end of the expander is a transverse bar 15 movable in a slot in the shank 10 and actuated by a rotary handle 16, the parts described so far being similar, or substantially so, to the parts shown in my prior application No. 415,412, filed October 7, 1920.

At the forward end of the reamer is a collar 17 held in place by a screw 18 having threaded engagement with the central orifice in the reamer. This screw supports a longitudinal bar 19 fitting closely at one end in a hole in the screw. The collar 17 extends at one end over shoulders 20 on a series of removable blades 21 adapted to be inserted in the slots between the permanent blades of the reamer. At the opposite end each removable blade has a hook 22 for engagement by a second collar 23 having an internal groove therein. Each blade has an inward extension 24 substantially midway of its length. At its ends each blade bears on an inclined surface on the shank 10.

The permanent blades 11 are shown in this embodiment as being ten in number but the number may vary in accordance with the size of the reamer or for other considerations. In the present embodiment of the invention three of the blades have a cutting edge extending along their entire length. The remaining blades are provided at one end with a cutting edge formed by providing a clearance as indicated at 25 in Figure 4, while the remaining portion of each blade is formed as a bearing or polishing member. Its form is indicated at 27 in Figure 4 and owing to this form it has no cutting action but merely glides along the surface of the orifice to be engaged. The removable blades are similarly formed, approximately a third of the whole number having cutting edges extending the entire length of the blade while the remaining blades have a cutting edge at 27 extending substantially one-third of their length, and a concentric surface at 29 whereby no cutting action is permitted. Figure 4 shows at 28 a section of such a blade and at 29' an end view of the raised portion on which the surface 29 is formed. It will be seen that the guiding surfaces will hold the reamer truly concentric in the opening, and prevent chattering, or in case the resistance should be less at one side thereof as by reason of a key-slot or oil groove, it will prevent excessive cutting at the side.

In the operation of the device as shown in Figure 1 the forward portion of the reamer may be used at first for reaming out a hole, all the blades having cutting edges at this part whereby rapid work may be done. At this time also the blades may be expanded as explained in my prior application as by adjustment of the cone 14 to increase the diameter of the cutting surfaces. As the reamer moves forward those blades whose cutting edges extend the full length of the reamer will continue to cut while the remaining blades exert only a finishing and polishing effect. I have described the reamer as having three full length blades and seven blades whose cutting edges extend approximately one-third of their length, but I do not limit myself to the specific relation of parts since the number of full length blades may vary from one up to approximately one-half the entire number of blades or, otherwise expressed, the full length cutting blades must occupy less than one-half the circumference of the reamer. Similarly the relative lengths of cutting and non-cutting surfaces may be varied on the remaining blades.

Should it be desirable to ream a hole out further than the capacity of the reamer in Figure 1, or if a larger hole is to be reamed out, removable blades can be inserted in the slots between the fixed blades and the number of such removable blades may correspond to that of the fixed blades or may be less than such number. There will be as least one full length cutting blade and their number may vary as in the previously described case so long as the section occupied by the full length blades remains less than a semi-circumference of the reamer. The remaining slots at the other side of the reamer or certain of them will be occupied by removable blades such as that shown in Figure 5, all of the blades being held down by the collars 17 and 23 and the collar 17 being held in place by screw 18. As will be evident from consideration of Figure 2 the lugs 24 are located somewhat in rear of the inclined surface on the fixed blades. The result of this is that the removable blades may be expanded to their fullest extent before the cone 14 can contact with said inclined surfaces of the fixed blades. To prevent excessive expansion of the removable blades and unnecessary movement of the fixed blades I have provided one or more rods as shown at 19. In Figure 2 the rod 19 is positioned to permit movement of the cone 14 sufficient to expand the blades 21 to the proper limit after which the movement of the cone will be stopped by the rod. It will be evident that several sets of blades differing in size may be provided and in such case each set may have its lugs 24 further back toward the rear of the reamer, or in the position shown in Figure 2, and rods 19 of proper relative length will be provided according to the desired movement of the cone 14. The slots of the reamer need not all be occupied when removable blades are used, and various other changes may be made without departing from the spirit of my invention all within the scope of the appended claims.

Having thus fully described my said invention, what I claim as new and desire to secure by Letters Patent, is:

1. A reamer comprising a hollow shank, permanent blades on the shank, removable blades interposed between said permanent blades, and means for interchangeably expanding the two sets of blades, substantially as set forth.

2. A reamer comprising a hollow shank and having a plurality of sets of resilient blades of various sizes, means for holding the blades in position at their ends, a lug on each blade the lugs of each set of blades being in the same transverse plane, and a longitudinally movable expander for engagement with the lugs of each set, substantially as set forth.

3. A reamer having a set of permanent expansible blades, a cone for acting on extensions of said blades to expand the reamer, a set of resilient removable blades adapted to be positioned between said permanent blades, extensions on said blades adapted to be engaged by said cone prior to its engagement with extensions on the permanent blades, a collar for holding the removable blades at one end, and a screw extending axially of the reamer the head of said screw holding the collar in place and the shank of the screw limiting the movement of the cone, substantially as set forth.

4. A reamer having permanent blades, removable blades positioned between the permanent blades, means for holding said removable blades in place, common means for expanding said blades, and means for limiting the action of said expanding means, substantially as set forth.

5. A reamer having permanent blades, removable blades positioned between the permanent blades, means for holding said removable blades in place, common means for expanding said blades interchangeably, and means whereby the action of the expanding means may be limited to the removable blades, substantially as set forth.

6. A reamer having a plurality of removable resilient blades, means for holding them in fixed position at the ends, a single expanding means acting on the blades between their ends, and means to limit the action of the expanding means to prevent overexpansion of the blades, substantially as set forth.

7. A reamer having a set of permanent expansible blades, a cone for acting on extensions of said blades to expand the reamer, a set of removable blades between said permanent blades, extensions on said removable blades adapted to be engaged by said cone prior to its engagement with extensions on the permanent blades, a collar at the forward end of the reamer extending over shoulders on the blades to secure them in place, a screw located axially of the reamer having a head to hold the collar in place, and an extended shank on the screw for engaging the cone to limit its travel, substantially as set forth.

8. A reamer having resilient blades comprising a set of cutting blades at one side each provided with a cutting edge from end to end of its outer face and blades at the other side of the reamer each provided with a cutting edge for a part of its length and a polishing surface for the remainder, a cone movable axially of the reamer for expanding the blades, and means to limit the travel of said cone to prevent overexpansion of the blades, substantially as set forth.

9. A reamer having a series of cutting blades in a sector comprising less than one-half of the circumference of the reamer each blade provided with a cutting edge from end to end of its outer face, and removable blades in the remaining sector provided with bearing and polishing surfaces, substantially as set forth.

10. A reamer comprising a hollow shank, permanent blades on the shank removable blades interposed between said permanent blades and having ledges overlapping the working faces of the permanent blades and means for interchangeably expanding the two sets of blades, substantially as set forth 11. A reamer having a set of permanent expansible blades, a cone for acting on extensions of said blades to expand the reamer, a set of removable blades adapted to be positioned between said permanent blades and extensions on said blades adapted to be engaged by said cone prior to its engagement with extensions on the permanent blades, substantially as set forth.

In witness whereof, I have hereunto set my hand and seal at Washington, District of Columbia, this 18th day of October, A. D. nineteen hundred and twenty-one.

AARON T. ROSSIGNOL. [L. S.]

Witnesses:
E. W. BRADFORD,
O. M. KEYS.